US010791797B2

(12) United States Patent
Neumann et al.

(10) Patent No.: US 10,791,797 B2
(45) Date of Patent: Oct. 6, 2020

(54) ARTICLE OF FOOTWEAR

(71) Applicant: Under Armour, Inc., Baltimore, MD (US)

(72) Inventors: Kort Neumann, Portland, OR (US); Alan Toronjo, Portland, OR (US)

(73) Assignee: UNDER ARMOUR, INC., Baltimore, MD (US)

( * ) Notice: Subject to any disclaimer, the term of this patent is extended or adjusted under 35 U.S.C. 154(b) by 167 days.

(21) Appl. No.: 15/922,282

(22) Filed: Mar. 15, 2018

(65) Prior Publication Data

US 2018/0263339 A1    Sep. 20, 2018

Related U.S. Application Data

(60) Provisional application No. 62/472,818, filed on Mar. 17, 2017.

(51) Int. Cl.
| A43B 23/00 | (2006.01) |
| A43B 23/02 | (2006.01) |
| A43B 3/00 | (2006.01) |
| A43B 1/02 | (2006.01) |
| B29D 35/14 | (2010.01) |

(52) U.S. Cl.
CPC .............. *A43B 23/026* (2013.01); *A43B 1/02* (2013.01); *A43B 3/0036* (2013.01); *A43B 23/0235* (2013.01); *B29D 35/146* (2013.01); *A43B 23/0205* (2013.01)

(58) Field of Classification Search
CPC .... A43B 23/026; A43B 3/0036; B29D 35/146

USPC .......................................................... 36/45
See application file for complete search history.

(56) References Cited

U.S. PATENT DOCUMENTS

| 9,320,321 | B2* | 4/2016 | Robinson, Jr. ......... A43B 23/24 |
| 2004/0088888 | A1* | 5/2004 | Johnston ................... A43B 5/02 |
| | | | 36/133 |
| 2005/0268497 | A1* | 12/2005 | Alfaro .................. A43B 1/0027 |
| | | | 36/136 |
| 2014/0059734 | A1* | 3/2014 | Toronjo ............. A43B 23/0295 |
| | | | 2/69 |
| 2014/0237853 | A1* | 8/2014 | Fisher .................... A43D 3/022 |
| | | | 36/46.5 |
| 2017/0156443 | A1* | 6/2017 | Guyan ................. A43B 23/028 |

* cited by examiner

*Primary Examiner* — Timothy K Trieu
(74) *Attorney, Agent, or Firm* — Edell, Shapiro & Finnan, LLC

(57) ABSTRACT

An improved article of footwear includes a sole structure and an upper. The upper is coupled to the sole structure and is configured to receive at least a portion of a human foot. The upper further includes a toebox, a medial quarter, a lateral quarter, a heel cup. The upper also includes a three dimensional auxetic structure at least partially formed within the medial quarter, lateral quarter, and heel cup of the upper. The three dimensional auxetic structure defines a primary expansion direction, a secondary expansion direction, and a tertiary expansion direction. The secondary expansion direction is transverse to the primary expansion direction. The tertiary expansion direction is normal to the plane defined by the primary expansion direction and the secondary expansion direction. Furthermore, the upper of the article of footwear is constructed via a thermoforming process.

15 Claims, 9 Drawing Sheets

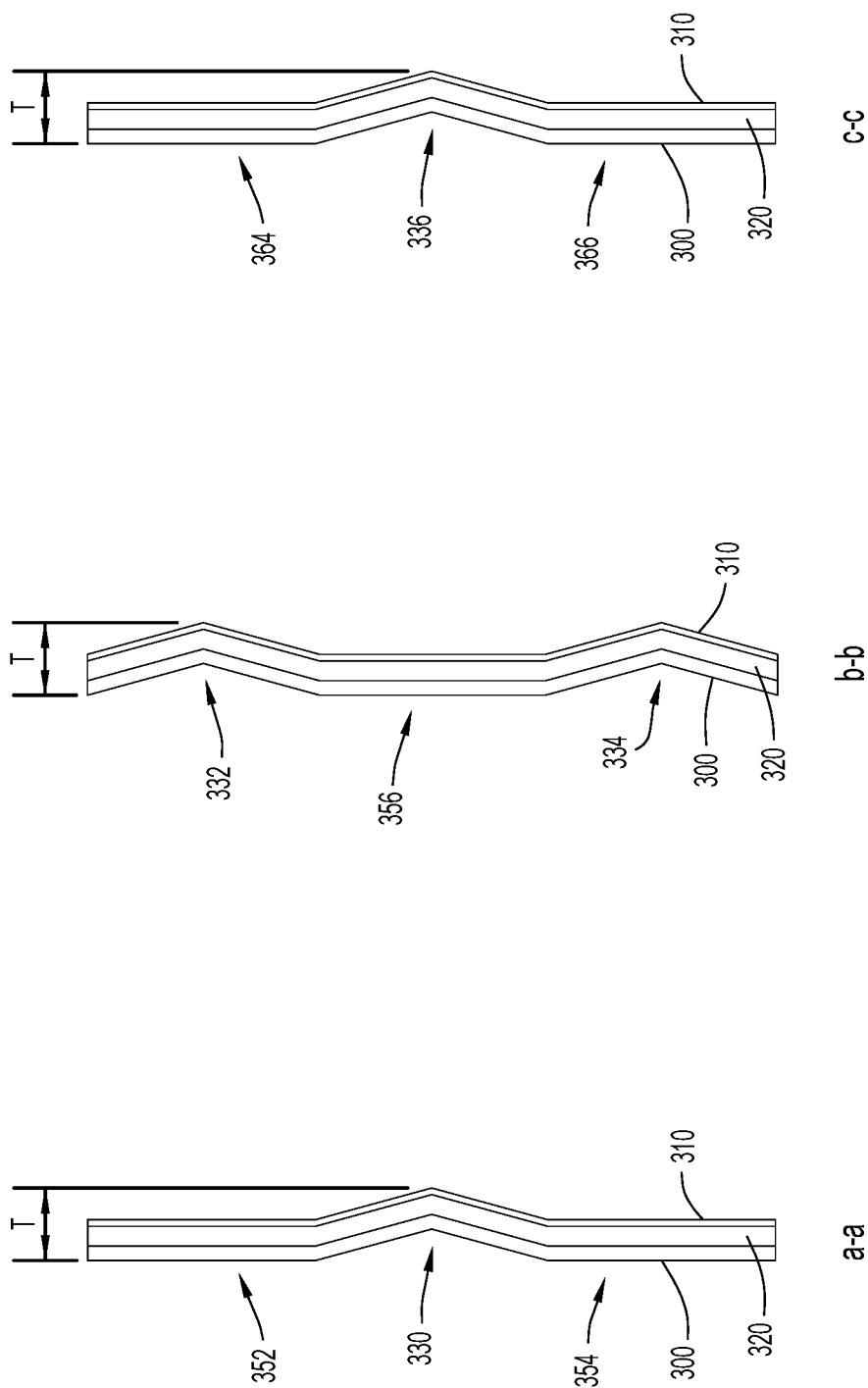

d-d e-e f-f

ARTICLE OF FOOTWEAR

CROSS-REFERENCE TO RELATED APPLICATIONS

This application claims priority under 35 U.S.C. 119(e) to U.S. Provisional Patent Application Ser. No. 62/472,818, entitled "ARTICLE OF FOOTWEAR WITH THERMOFORMED THREE DIMENSIONAL AUXETIC UPPER", filed Mar. 17, 2017, the disclosure of which is incorporated herein by reference in its entirety for all purposes.

FIELD OF THE INVENTION

The present invention relates to an article of footwear that provides an improved performance and fit of an upper around a foot.

BACKGROUND OF THE INVENTION

Footwear, particularly athletic footwear, are worn in a variety of activities including running, walking, hiking, team and individual sports, and any other activity where the protection and support of human feet is desired. In one configuration, an article of footwear includes an upper that forms a cavity in which a user places his or her foot. The article of footwear further includes a sole that engages the bottom of the foot and separates the foot from the ground. Uppers in athletic footwear are usually formed from one or more pieces of fabric, leather, and/or plastic that are stitched, bonded, or otherwise attached together. Various fasteners, including laces or strings, are used to secure the foot in the cavity defined by the upper.

Every human foot, however, differs in both shape and size. While articles of footwear are sold in various sizes, the sizes are generalizations of the size of a foot that may fit within the article of footwear. These sizes fail to take into consideration the varying shapes between different feet having the same size. Furthermore, conventional footwear contain uppers that may not adequately conform to varying the shapes of feet. Because conventional articles of footwear are incapable of accommodating varying feet shapes, and because of the size generalizations, the number of people that find a conventional article of footwear comfortable is limited. In turn, if conventional articles of footwear were designed to be comfortable for nearly every type of foot, those articles of footwear would fail to provide adequate support for the variety of feet, especially when performing athletic activities.

It would be desirable to provide an article of footwear with an auxetic structure disposed over at least a portion of the surface of the upper, where the auxetic structure is configured to contour to the diverse shapes of a wide variety of feet. Moreover, it would be desirable for the auxetic structure to be three dimensional, which enables the auxetic structure to expand in two directions, while also being able to compress in a third direction when necessary. This three dimensional auxetic structure enables the upper to contour and flex with the movements of a foot disposed within the upper without bending, folding, or creasing.

SUMMARY OF THE INVENTION

In accordance with example embodiments of the invention, an article of footwear includes a sole structure and an upper. The upper is coupled to the sole structure and is configured to receive at least a portion of a human foot. The upper further defines a toebox, a medial quarter, a lateral quarter, a heel cup. The upper includes a series of hinged panels adapted to pivot upon the application of force. In particular, the upper may include a three dimensional auxetic structure at least partially formed within the medial quarter, lateral quarter, and/or heel cup of the upper. The three dimensional auxetic structure defines a primary expansion direction, a secondary expansion direction, and a tertiary expansion direction. The secondary expansion direction is transverse to the primary expansion direction. The tertiary expansion direction is normal to the plane defined by the primary expansion direction and the secondary expansion direction. Furthermore, the upper of the article of footwear is constructed via a thermoforming process.

In an embodiment, the article of footwear includes a sole structure and an upper. The upper may be coupled to the sole structure and may be configured to receive at least a portion of a human foot. The upper may further include a toebox, a medial quarter, a lateral quarter, and a heel cup. The upper may also include a three dimensional auxetic structure formed at least partially along the medial quarter, the lateral quarter, and the heel cup of the upper.

In yet another embodiment, the article of footwear includes a sole structure and an upper. The upper may be coupled to the sole structure and may be configured to receive at least a portion of a human foot. The upper may further a three dimensional auxetic structure over a portion of the upper.

In a further embodiment, the article of footwear includes a sole structure and an upper. The upper may be coupled to the sole structure and may be configured to receive at least a portion of a human foot. The upper may further include a forefoot region, a hindfoot region, and a midfoot region that is disposed between the forefoot and hindfoot regions. The upper may also include a three dimensional auxetic structure formed along the midfoot region and the hindfoot region of the upper.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWING

FIG. 3B illustrates cross-sectional views along lines a-a, b-b, and c-c of the portion of the upper of the article of footwear illustrated in FIG. 3A.

Like reference numerals have been used to identify like elements throughout this disclosure.

DETAILED DESCRIPTION OF THE INVENTION

Figure 1:
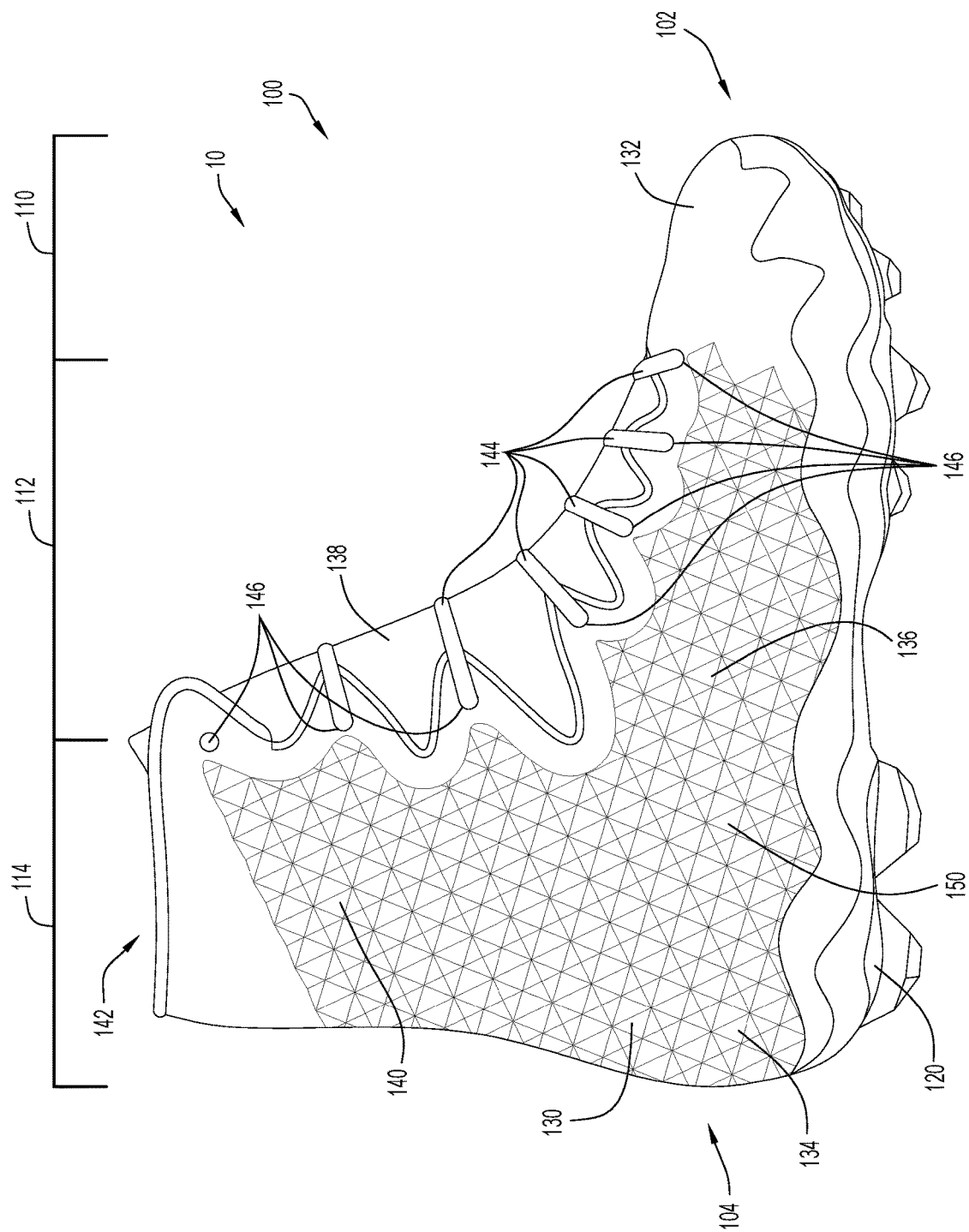
FIG. 1 illustrates a side view in elevation of the lateral side of an example embodiment of an article of footwear in accordance with the present invention.

The present invention relates to an article of footwear with an upper including a portion defined by a plurality of hinged panels configured to pivot from a first, out-of-plane position and toward a second, in-plane or aligned position. In an embodiment, the panels are organized in cells configured to lower the Poisson's ratio of the upper (compared to a similar upper lacking the cell structure). In particular, the cells may provide auxetic properties to the upper by forming a three-dimensional auxetic pattern. The three-dimensional auxetic pattern enhances the mechanical properties of the upper, such as creating high energy absorption characteristics and a greater ability to stretch with movement of the foot disposed within the article of footwear. Thus, the formation of the upper as described herein enables the upper to support the foot disposed within the upper, especially during movements of the foot, while simultaneously providing comfort to the user.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

An article of footwear or shoe 10 includes a lateral side 100 oriented along the lateral or little toe side of the user's foot, a medial side (not illustrated) oriented along the medial or big toe side of the user's foot, a toe (i.e., front) end 102 that corresponds with the toes of the user's foot, and a heel (i.e., rear) end 104 that corresponds with the heel of the user's foot. While the example embodiment depicted in the FIG. 1 shows an article of footwear 10 configured for a right foot, it is noted that the same or similar features can also be provided for an article of footwear 10 configured for a left foot (where such features of the left footed article of footwear are a reflection of or "mirror image" symmetrical in relation to the right footed article of footwear, e.g., the embodiment depicted in FIG. 1).

The article of footwear 10 may include a forefoot region 110 that generally aligns with the ball and toes of a user's foot (i.e., when a user is wearing the article of footwear 10), a midfoot region 112 that generally aligns with the arch and instep areas of the user's foot, and a hindfoot region 114 that generally aligns with the heel and ankle areas of the user's foot. The embodiment of the article of footwear 10 illustrated includes a sole structure 120 and an upper 130 affixed to the sole structure 120. The article of footwear 10, also referred to herein as a shoe, can be in the form of an athletic cleat or other type of athletic shoe.

The upper 130 defines an envelope or pocket that covers and protects the foot of the wearer. In some embodiments, the upper 130 covers and protects the foot of the wearer together with the sole structure 120. The upper 130 includes a toe cage 132 disposed proximate to the front end 102 of the article of footwear 10 in the forefoot region 110 of the article of footwear 10. The upper 130 further includes a heel cup 134 disposed in the hindfoot region 114, where the heel cup 134 spans around the heel end 104 of the article of footwear 10. As further illustrated, the upper 130 includes a lateral quarter 136 that extends through the midfoot region 112 from the toe cage 132 to the heel cup 134 along the lateral side 100 of the article of footwear 10. While not illustrated, the upper 130 further includes a medial quarter that extends through the midfoot region 112 from the toe cage 132 to the heel cup 134 along the medial side of the article of footwear 10. The medial quarter may be substantially similar to the lateral quarter 136, but the medial quarter is not coupled directly to the lateral quarter 136. The toe cage 132 connects the medial quarter to the lateral quarter 136 through the forefoot region 110, while the heel cup 139 connects the medial quarter to the lateral quarter 136 through the hindfoot region 114. Thus, the medial quarter and the lateral quarter 136 are not connected to one another through the midfoot region 112 of the upper 130 (i.e., over the instep).

The upper 130 also includes a tongue portion 138 that is disposed in the midfoot region 112 between the lateral quarter 136 and the medial quarter (i.e., over the instep). The tongue portion 138 is not directly coupled to the lateral quarter 136 and the medial quarter, such that the lateral quarter 136 and the medial quarter at least partially overlap the tongue portion 138. The tongue portion 138 may be coupled to the rear end of the toe cage 132 and may extend rearward through the midfoot region 112 to the hindfoot region 114 while being disposed between the medial quarter and lateral quarter 136.

The upper 130 may possess any dimensions (size/shape) suitable for its described purpose. The embodiment of the upper 130 illustrated in FIG. 1 contains a "high top" configuration in which the hindfoot region 114 of the upper 130 includes an ankle extension 140 that extends upwardly from the heel cup 134 of the upper 130 such that the ankle extension 140 is disposed over and/or above at least a portion of a wearer's ankle. In other embodiments, the upper 130 may possess a low top configuration in which the upper 130 contains a smaller ankle extension 140, or even no ankle extension 140, such that the upper 130 only extends to a location beneath the wearer's ankle. In another embodiment the upper may contain a "mid top" configuration in which the ankle extension 140 of the upper 130 is larger than in the low top configuration but smaller than in the high top configuration, where the upper 130 and ankle extension 140 extends to a location that is slightly below or at the wearer's ankle.

As further illustrated in FIG. 1, a collar or opening 142 may be disposed in the hindfoot region 114 of the upper 130. The opening 142 provides access to the interior of the upper 130 and enables a foot of a wearer of the article of footwear 10 to be placed within the interior of the upper 130. The opening 142 may be collectively defined by the ankle extension 140 and the rear end of the tongue portion 138.

In addition, a fastening element 144 (e.g., a lace, cord, string, etc.) may be threaded through the eyelets 146 that are disposed in the lateral quarter 136, medial quarter, and the ankle extension 140 portions of the upper 130. The fastening element 144 may be utilized to secure or tighten the upper 130 around the foot and ankle disposed within the interior of the upper 130.

Still referring to FIG. 1, the upper 130 is coupled to the sole structure 120 via any conventional and/or other suitable manner (e.g., via any form of adhesion or bonding, via a woven connection, via one or more types of fasteners, etc.). In the particular embodiment depicted, the sole structure 120 may be substantially rigid and constructed with a set of protuberances or traction elements (e.g., spikes, cleats, etc.) that extend downwardly from the bottom surface of the sole structure 120. In other embodiments, the sole structure 120 may be constructed of a compression material, such as ethylene-vinyl acetate (EVA) foam, where the compression material is configured to compress on impact and provide cushion to the user's foot as the article of footwear 10 impacts a support surface.

The upper 130 can be formed of any one or more materials suitable for its described purpose, including conventional materials (e.g., woven or nonwoven textiles, knit textiles, leather, synthetic leather, rubber, etc.). As further detailed below, the upper 130 may be constructed from a compression molding process (i.e., thermoformed) that permits the formation of a textile laminate having unique geometries including, e.g., predetermined macrostructures and/or microstructures located at one or more selected locations along the upper. For example, as illustrated in FIG. 1, the upper 130 includes a pattern 150 of indentations/depressions and raised ridges/protrusions (e.g., a pattern 150 having generally concave depressions, such as polygonal or diamond shaped depressions) disposed on the upper 130 in the midfoot and hindfoot regions 112, 114 (e.g., the heel cup 134, the lateral quarter 136, the medial quarter, the tongue portion 138, and the ankle extension 140). By way of further example, the upper 130 may be formed with the pattern 150 such that the pattern causes the upper 130 to functional as an auxetic material with three dimensional characteristics. Generally, auxetics are materials that have a negative Poisson's ratio such that, when stretched, the auxetic materials become thicker (as opposed to thinner for conventional materials) perpendicular to the applied force. Imparting auxetic features within one or more layers (e.g., fabric, foam and/or internal structural support member layers) can provide the effect of enhancing the mechanical properties like high energy absorption characteristics, greater ability to stretch without tearing/fracturing, etc.

Figure 2:
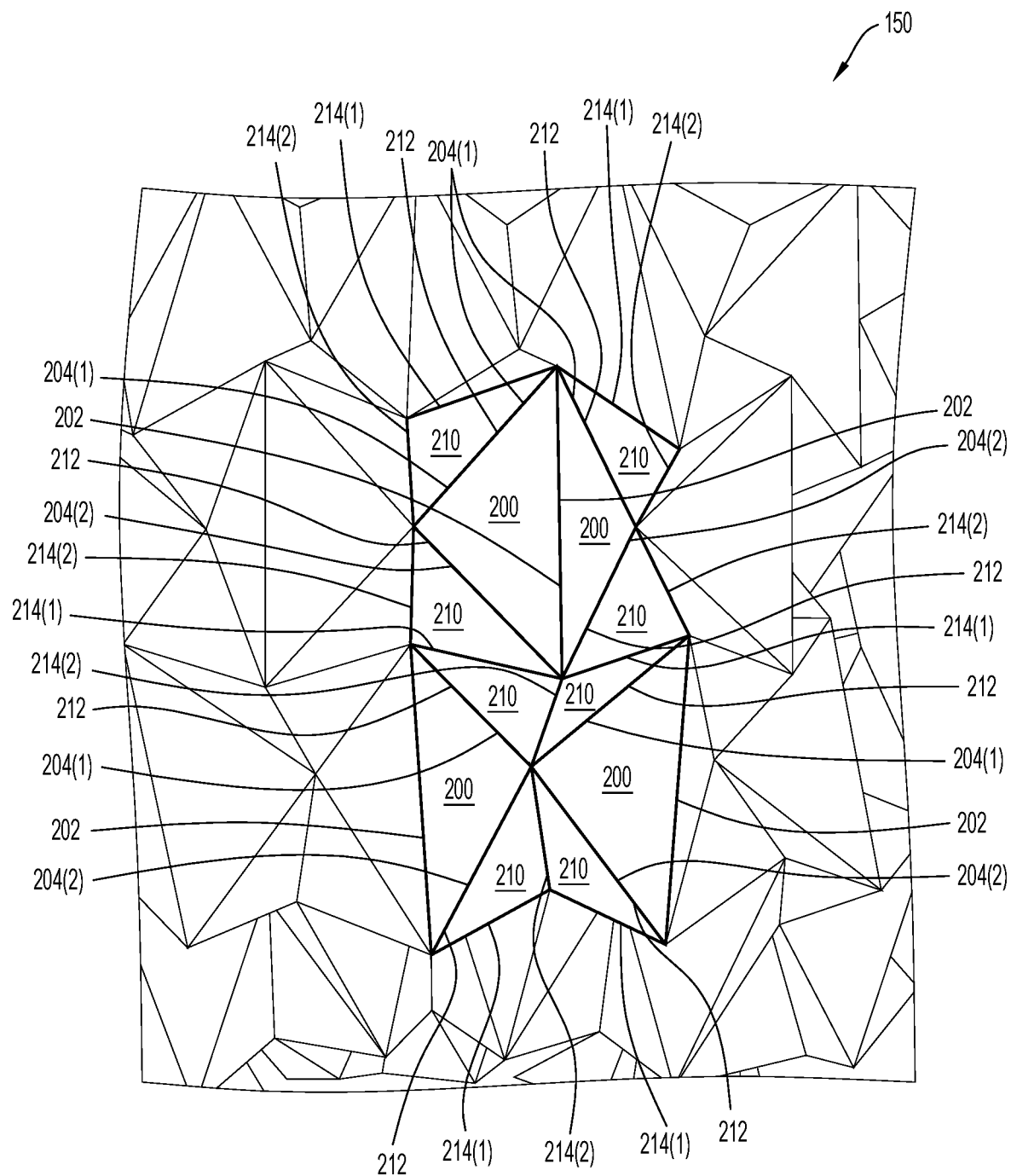
FIG. 2 illustrates a detailed top view of a portion of the upper of the embodiment of the article of footwear illustrated in FIG. 1.
Figure 3A:
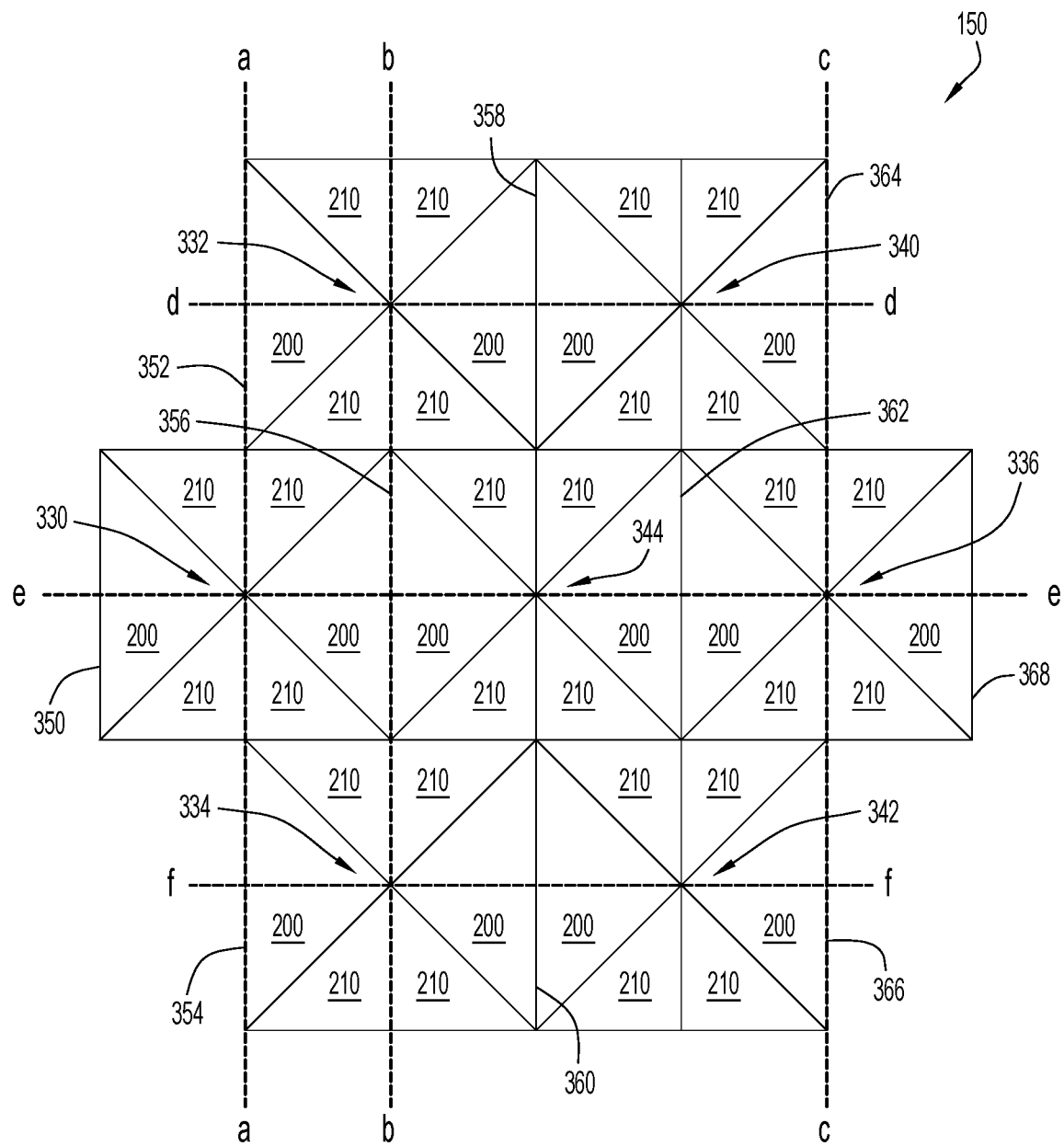
FIG. 3A illustrates a plan view of a portion of the pattern disposed on the upper of the example embodiment of the article of footwear illustrated in FIG. 1.

As best illustrated in FIGS. 2 and 3A, the pattern 150 of indentations and/or protrusions is provided by a plurality of panels 200, 210 pivotally coupled to adjacent panels along boundaries or fold lines. The panels 200, 210 may be any shape suitable for its described purpose. By way of example, the panels 200, 210 are polygons such as triangles (e.g., isosceles triangles). In particular, the pattern 150 is formed by a series of interconnected triangles 200, 210 joined along panel edges or boundaries 202, 204(1), 204(2), 212, 214(1), 214(2). Specifically, the pattern 150 includes a plurality of first triangular segments 200 and a plurality of second triangular segments 210 disposed adjacent one another. As best illustrated in FIG. 3A, the first triangular segments 200 are larger than the second triangular segments 210, and may be double the size of the second triangular segments 210 (e.g., two second triangular segments 210 placed adjacent to one another may equal the size of one first triangular segment 200).

The first triangular segments 200 include a first edge 202 and two second edges 204(1), 204(2). The first edge 202 is longer in length than the second edges 204(1), 204(2). Similarly, the second triangular segments 210 include a first edge 212 and two second edges 214(1), 214(2). As illustrated in FIG. 2, the first edges 202 of the first triangular segments 200 are coupled only to other first edges 202 of other first triangular segments 200. The second edges 204(1), 204(2) of the first triangular segments 200, however, are coupled to the first edges 212 of the second triangular segments 210. Furthermore, the second edges 214(1), 214(2) of the second triangular segments 210 are coupled only to other second edges 214(1), 214(2) of the second triangular segments 210.

The connection of the same type of edges to one other creates ridges/protrusions in the pattern 150, in which edges meet along an apex, while the connection of different types of edges to one another form indentations/depressions in the pattern 150. For example, the connection of the first edge 202 of the first triangular segment to another first edge 202 of another first triangular segment 200 creates a ridge in the pattern 150. Additionally, the connection of the second edges 214(1), 214(2) of one second triangular segment 210 to the second edges 214(1), 214(2) of other second triangular segments 210 also creates ridges for the pattern 150. Conversely, the connection of the second edges 204(1), 204(2) of a first triangular segment 200 to the first edges 212 of second triangular segments 210 create depressions for the pattern 150. With this configuration, the outer surface of a first triangular segment 200 generally faces toward the outer surfaces of the second triangular segments 210 to which the first triangular segment 200 is coupled, and faces away from the outer surface of the other first triangular segment 200 to which the first triangular segment 200 is coupled. It then follows that the outer surface of a second triangular segment 210 generally faces towards the outer surface of the first triangular segment 200 to which the second triangular segment 210 is coupled, while the outer surface of the second triangular segment 210 generally faces away from the outer surfaces of the other second triangular segments 210 to which the first second triangular segment 210 is coupled.

The embodiment of portions of the upper 130 illustrated in FIGS. 3A, 3B, 3C, 4A, 4B, and 4C is constructed of three layers that are compression molded together to form the upper 130, where the compression molding process, as further explained below, creates the auxetic pattern 150 in the upper 130. As illustrated, the upper 130 may be constructed of an exterior layer 300, an interior layer 310, and an intermediate later 320. The intermediate layer 320 may be disposed between the exterior layer 300 and the interior layer 310. In other embodiments, the upper 130 may be formed from any number of layers that are compression molded together. In one embodiment, the exterior layer 300 may be constructed from a thermoplastic polyurethane (TPU) hot melt that has an approximate thickness of about 0.1 mm to about 0.4 mm (e.g., about 0.2 mm). The intermediate layer 320 may be constructed from a polyester microfiber. In one embodiment, the intermediate layer 320 may be constructed from a non-woven polyester fabric that contains vertically lapped fibers, where, prior to being subjected to the compression molding process, the fabric may have an approximate thickness of about 1 mm to about 4 mm (e.g., about 2.5 mm). After being compression molded with the exterior layer 300 and interior layer 310, the fabric of the intermediate layer 320 may have an approximate thickness of 0.5 mm to about 2 mm (e.g., about 1.0 mm). The interior layer 310 may be constructed from a single layer polyester mesh material having an approximate thickness of about 0.5 mm to about 2 mm (e.g., about 1.0 mm). In some embodiments, the single layer polyester mesh material of the interior layer 310 may contain 10-15% spandex, elastane, or other material that contains a high elongation modulus. The upper 130 may contain a total thickness of approximately 1.1 mm to about 4.4 mm (e.g., about 2.2 mm) once compression molded.

Figure 3C:
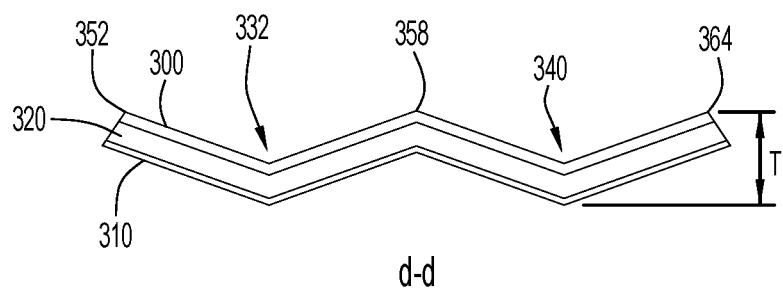
FIG. 3C illustrates cross-sectional views along line d-d, e-e, and f-f of portions of the upper of the article of footwear illustrated in FIG. 3A.
Figure 3C:
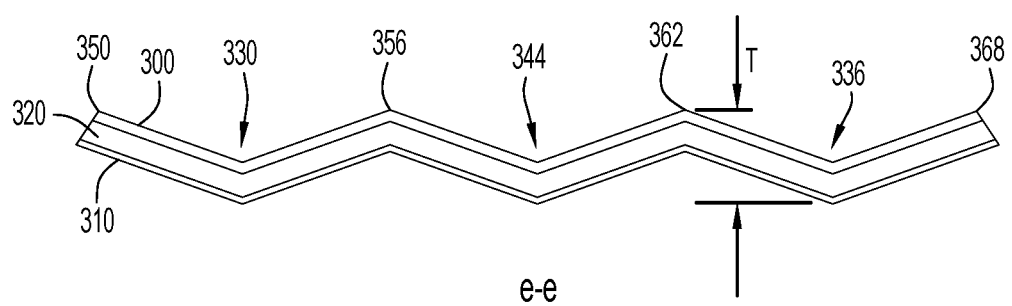
Figure 3C:
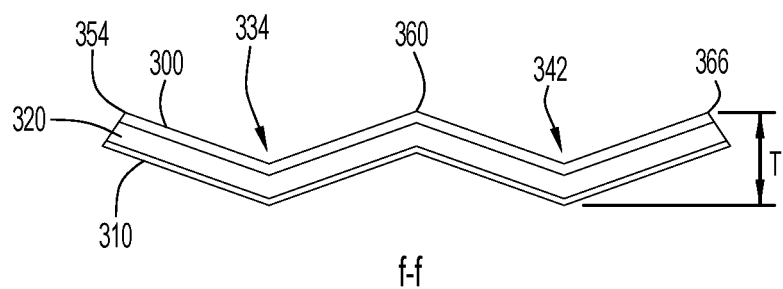

As previously explained, the connection of the plurality of first triangular segments 200 and the plurality of second triangular segments 210 of the pattern 150 to one another creates a series of ridges or protrusions (apex) and a series of indentations or depressions (nadir). As illustrated in FIGS. 3A, 3B, and 3C, the pattern 150 includes a series of indentations 330, 332, 334, 336, 340, 342, 344 and a series of ridges 350, 352, 354, 356, 358, 360, 362, 364, 366, 368. Each of the indentations 330, 332, 334, 336, 340, 342, 344 are disposed at the intersection or abutment of two first triangular segments 200 and four second triangular segments 210. Each of the ridges 350, 352, 354, 356, 358, 360, 362, 364, 366, 368 are disposed at the intersection or abutment of the first edge 202 of two first triangular segments 200.

As illustrated in FIGS. 3B and 3C, the cross-sectional views of a representative portion of the upper 130 demonstrate that the indentations 330, 332, 334, 336, 340, 342, 344 are disposed between the ridges 350, 352, 354, 356, 358, 360, 362, 364, 366 in alternating fashion both in the longitudinal direction (i.e., along cross-sectional views a-a, b-b, c-c) of the pattern 150 and in the lateral direction (i.e., along cross-sectional views d-d, e-e, f-f) of the pattern 150. In the longitudinal direction of the pattern 150, the indentations 330, 332, 334, 336, 340, 342, 344 are aligned with the length of the ridges 350, 352, 354, 356, 358, 360, 362, 364, 366, while, in the lateral direction, the indentations 330, 332, 334, 336, 340, 342, 344 are disposed on opposing sides of the ridges 350, 352, 354, 356, 358, 360, 362, 364, 366 and not along the length of the ridges 350, 352, 354, 356, 358, 360, 362, 364, 366. The pattern 150 forms a three dimensional auxetic structure as part of the upper 130 of the article of footwear 10. In particular, due to the first triangular segments 200 and the second triangular segments 210 being coupled to one another in such a manner that forms a series of indentations 330, 332, 334, 336, 340, 342, 344 and ridges 350, 352, 354, 356, 358, 360, 362, 364, 366, the pattern of first triangular segments 200 and the second triangular segments 210 are connected with one another such that the ridges 350, 352, 354, 356, 358, 360, 362, 364, 366 and the indentations 330, 332, 334, 336, 340, 342, 344 act as living hinges.

Stated another way, the panels are organized in rows of cells, each cell including panels 200 forming a first reentrant shape (e.g., an hourglass or bowtie), as well as panels 210 forming a second reentrant shape (e.g., hourglass or bowtie). The first reentrant shape, moreover, is oriented generally orthogonally (e.g., substantially orthogonally) to the second reentrant shape. The panels 200, 210 incline, originating at apex (as defined by edges 202, 214(1)) and meeting at the nadir of the cell to form the depression. Adjacent cell rows may be offset to align the nadir of a cell in one row with the edge or boundary 202 of a cell in another row. In this manner, a three-dimensional, multi-axis auxetic pattern is formed.

This enables the panels (the first triangular segments 200 and the second triangular segments 210) to independently flex or pivot along edges 202, 204(1), 204(2), 212, 214(1). 214(2) with respect to one another. Accordingly, as a force is applied to the upper 130, the panels 200, 210 pivot upward, toward a position in which all the panels become aligned along a plane. The pattern 150 of the panels being capable of independently flexing or pivoting along edges or boundaries 202, 204(1), 204(2), 212, 214(1). 214(2) with respect to one another provides the upper 130 with at least a lower Poisson's ratio than conventional uppers (i.e., uppers that do not contain the pattern of panels). As previously explained, in some embodiments, the pattern 150 may be a three dimensional auxetic pattern having a negative Poisson's ratio.

As previously explained, the thickness of the upper 130, as defined between the outer surface of the exterior layer 300 and the inner surface of the interior layer 310, can be about 2.2 mm. However, as illustrated in FIGS. 3B and 3C, because of the pattern 150, and more specifically, because of the ridges 350, 352, 354, 356, 358, 360, 362, 364, 366 and the indentations 330, 332, 334, 336, 340, 342, 344, the portion of the upper 130 that includes the pattern 150 has an overall thickness T when the upper 130 is in a unstretched state. The overall thickness T of the upper 130 is defined as the distance between the outer surface of the exterior layer 300 at the ridges 350, 352, 354, 356, 358, 360, 362, 364, 366 and the inner surface of the interior layer 310 at the indentations 330, 332, 334, 336, 340, 342, 344. In one embodiment, the overall thickness T of the upper 130 is approximately 3.0 mm.

Figure 4A:
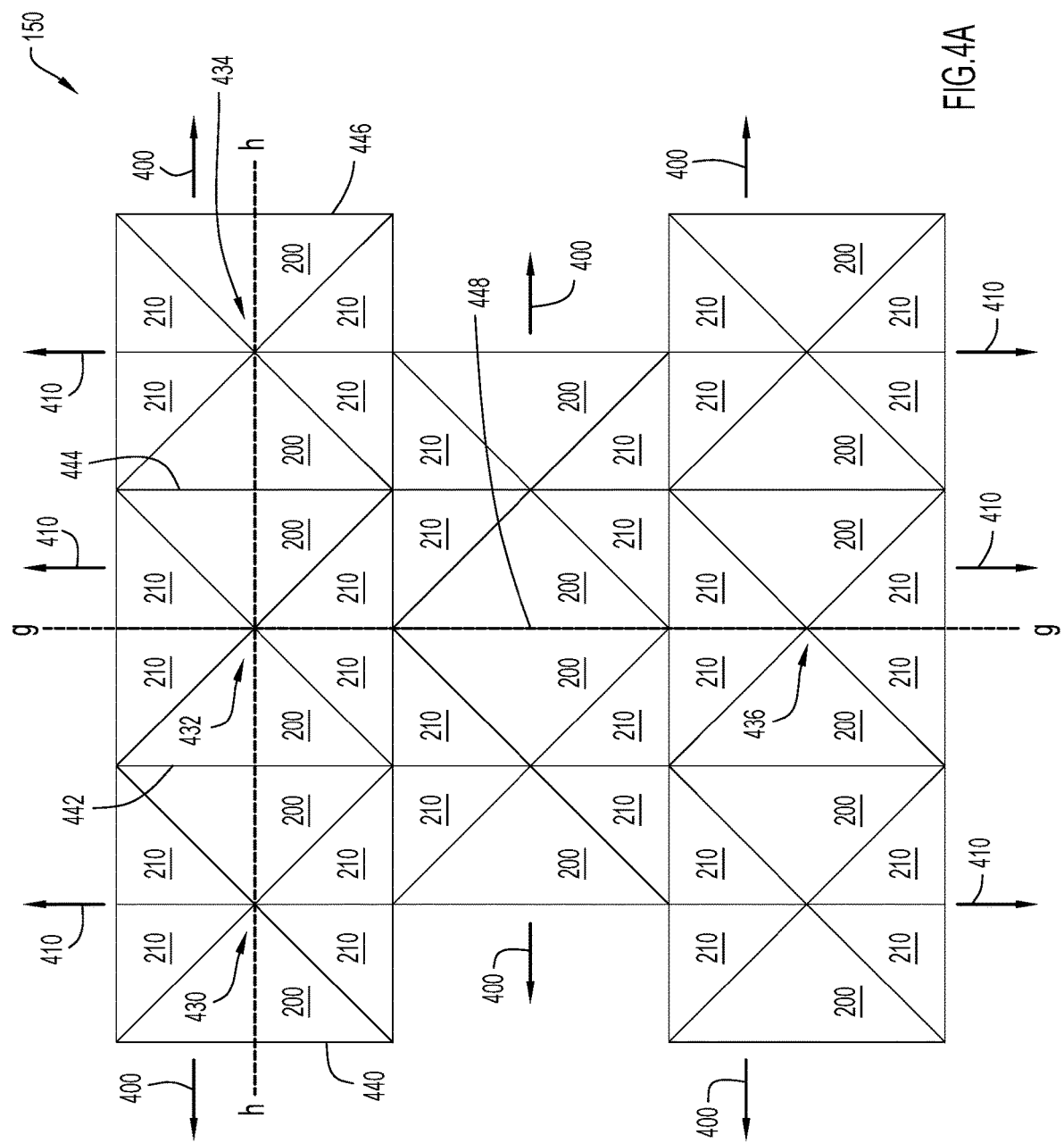
FIG. 4A illustrates a plan view of a portion of the pattern of the upper side of the example embodiment of the article of footwear illustrated in FIG. 1, and the effects of the pattern being stretched in a direction.
Figure 4B:
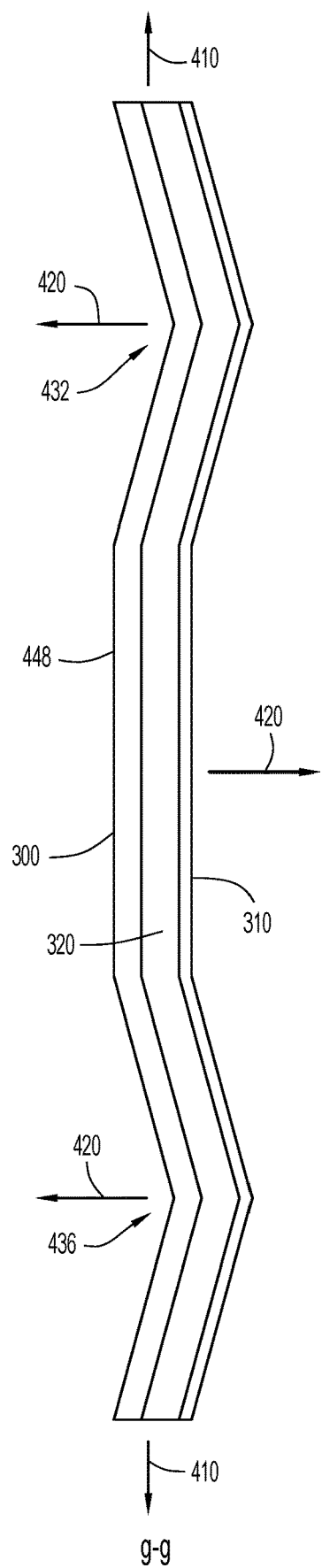
FIG. 4B illustrates a cross-sectional view along line g-g of the portion of the pattern of the upper of the article of footwear illustrated in FIG. 4A, and the effects of the pattern being stretched in a direction.
Figure 4C:
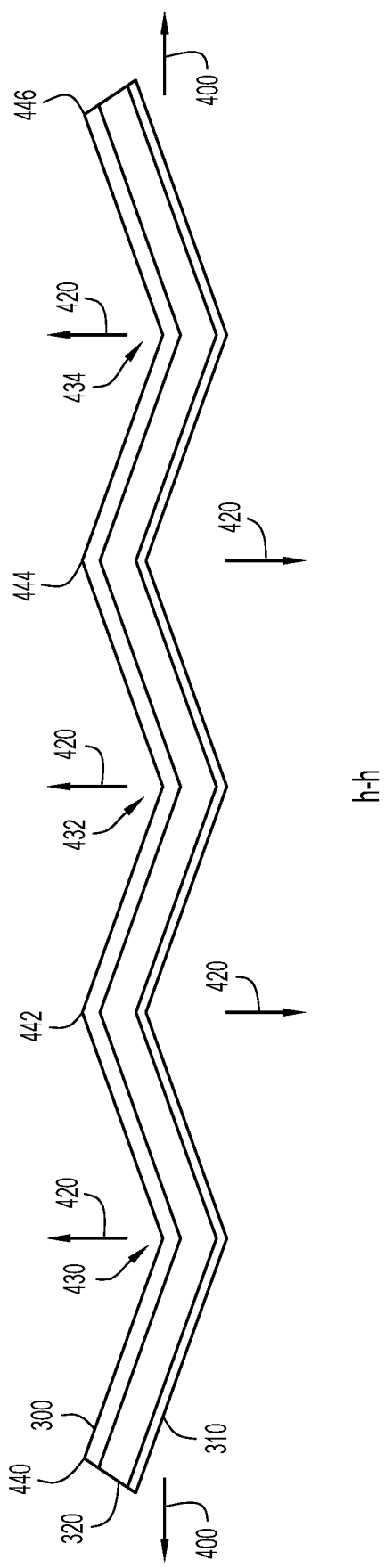
FIG. 4C illustrates a cross-sectional view along line h-h of the portion of the pattern of the upper of the article of footwear illustrated in FIG. 4A, and the effects of the pattern being stretched in a direction.

Turning to FIGS. 4A, 4B, and 4C, as the portion of the upper 130 defined by pattern 150 experiences a stretching or expansion force in a first expansion direction and/or a second expansion direction (where the first and second directions are perpendicular to each other to define two dimensions of the upper, e.g., X and Y dimensions in a three dimensional coordinate system), the upper 130 becomes thicker or expands along a third direction that is transverse (e.g., perpendicular) to the first and second directions (e.g., a Z dimension in a three dimensional coordinate system, a direction that is normal to the plane defined by the first expansion direction and the second expansion direction). The stretching or expansion force in the first and/or second direction of the upper 130 also causes the ridges of the pattern 150 to flatten or become less pronounced along the third direction that is transverse to the first and second directions via their living hinges. Similar to the portion of the pattern 150 of the upper 130 illustrated in FIG. 3A, the portion of the pattern 150 illustrated in FIG. 4A is constructed from a plurality of first triangular segments 200 and second triangular segments 210 that, as previously explained, collectively define a series of indentations 430, 432, 434, 436 and a series of ridges 440, 442, 444, 446, 448, thus defining a three dimensional auxetic pattern along at least the exterior surface of the upper 130.

As illustrated in FIGS. 4A, 4B, and 4C, when the pattern 150 of the upper 130 is stretched in a first direction 400 and/or a second direction 410 that is transverse the first direction 400 of the pattern 150, the portion of the upper 130 containing the pattern 150 becomes thicker or expands in a third direction 420 that is transverse or normal to the plane defined by the first and second directions 400, 410. Alternatively or in addition to, as best illustrated in FIGS. 4B and 4C, when the pattern 150 of the upper 130 is stretched or expanded in the first direction 400 or the second direction 410, the panels pivot along edges to align the panels along the same plane. Accordingly, the pattern 150 of the upper 130 flattens or becomes smoother along the ridges and indentations in the third direction 420 (i.e., in the thickness dimension of the upper 130) while the thickness of the upper 130 in this region increases. FIG. 4B illustrates the cross-sectional view of the pattern 150 taken along line g-g, and depicts the indentations 432, 436 and the ridge 448 becoming flattened or aligning more closely within a plane that includes line g-g, while the thickness of the upper 130 is simultaneously increased, as the pattern 150 is expanded in the first direction 400 and/or the second direction 410.

More specifically, because the indentations 432, 436 and the ridge 448 collectively operate as living hinges, as the pattern 150 is expanded in the first direction 400 and/or the second direction 410, the indentations 432, 436 become less pronounced and more aligned along (e.g., closer to) the plane that includes line g-g. Furthermore, FIG. 4C illustrates the cross-sectional view of the pattern 150 taken along line h-h, and depicts the ridges 440, 442, 444, 446 and the indentations 430, 432, 434 becoming aligned within a plane including line h-h, while the thickness of the upper 130 is simultaneously increased, as the pattern 150 is expanded in the first direction 400 and/or the second direction 410. More specifically, because the ridges 440, 442, 444, 446 and the indentations 430, 432, 434 collectively operate as living hinges, as the pattern 150 is expanded in the first direction 400 and the second direction 410, the indentations 430, 432, 434 become less pronounced and more aligned along (e.g., closer to) the plane which includes line h-h.

Conversely, because the series of indentations 430, 432, 434, 436 and a series of ridges 440, 442, 444, 446, 448 collectively form a series of living hinges, as the pattern 150 of the upper 130 experiences a compression force in the first compaction direction (e.g., opposite of the first expansion direction 400) and/or second compaction direction (e.g., opposite of the second expansion direction 410), the upper 130 experiences a compression force in either the first or second compaction directions, and the indentations 430, 432, 434, 436 and ridges 440, 442, 444, 446, 448 become more pronounced. Furthermore, as the pattern 150 of the upper 130 experiences the compression force in the first compaction direction and/or second compaction direction, the upper 130 also becomes thinner or more compact in a third compaction direction (e.g., opposite of the third expansion direction 420).

The three dimensional auxetic configuration as described herein also allows for the greater absorption of forces applied directly to a surface (e.g., the exterior surface) of the upper. For example, when a force is applied to the exterior surface of the upper 130, and that force is transverse to the exterior surface, the three dimensional auxetic pattern 150 causes a condensing or compaction of the structural material forming the upper so as to absorb the force.

Figure 5:
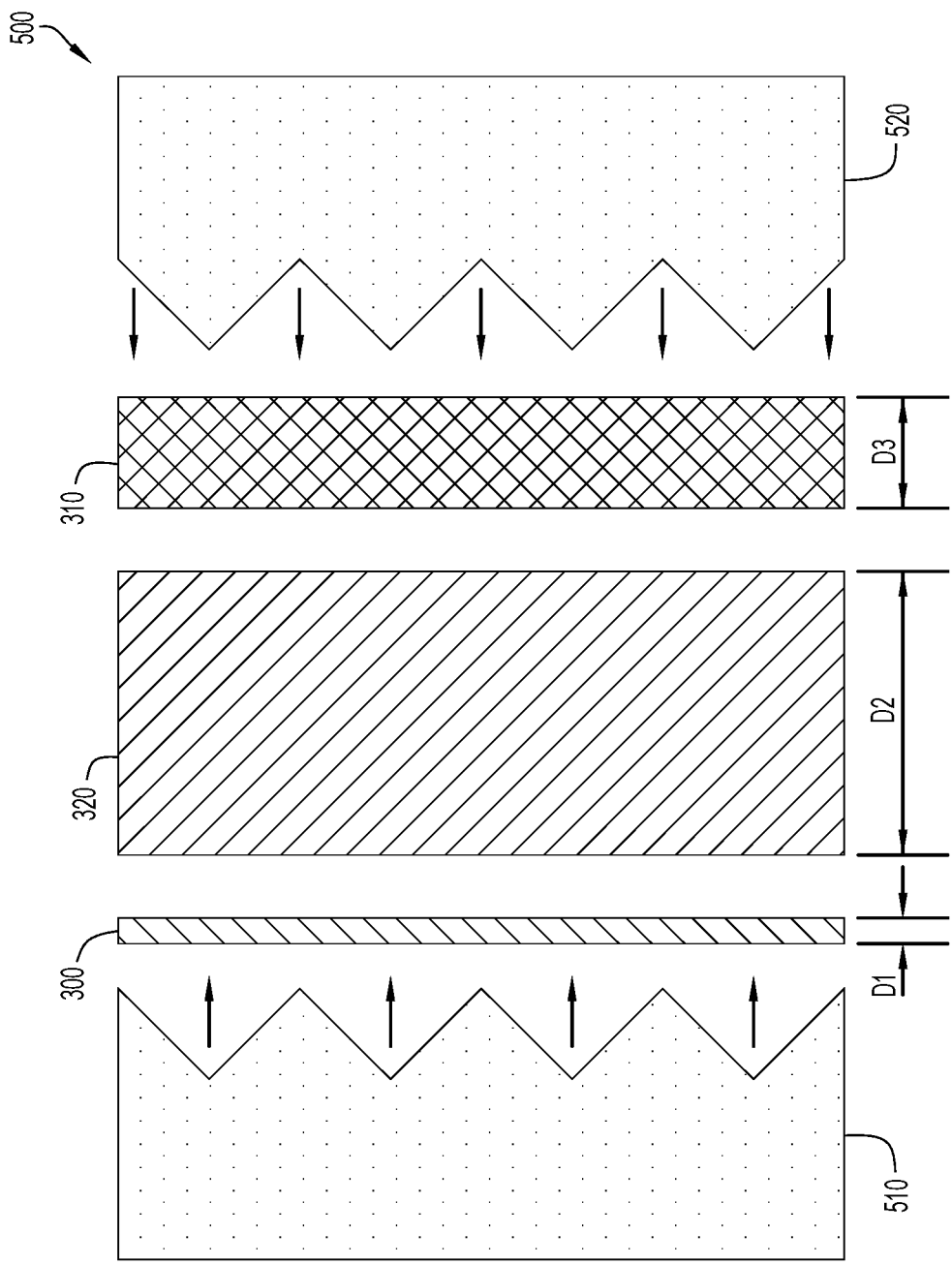
FIG. 5 illustrates a cross-sectional view of a compression molding apparatus showing upper formation and layers of a fabric laminate that form a portion of an upper of the article of footwear of FIG. 1.

Turning to FIG. 5, an example embodiment is depicted showing the formation of a fabric laminate 500 used to form the upper 130. As previously explained, the fabric laminate 500 used to form the upper 130 includes a plurality of layers that are oriented or "stacked" in the following alignment (from interior/foot-facing side to exterior side of upper 130): internal layer 310/intermediate layer 320/exterior layer 300. As previously explained, the exterior layer 300 may be constructed from a TPU hot melt that has an approximate thickness of D1. The intermediate layer 320 may be constructed from a polyester microfiber, where, in one embodiment, the intermediate layer 320 is constructed from a non-woven polyester fabric that contains vertically lapped fibers. A non-woven polyester fabric with vertically lapped fibers may have a first thickness prior to experiencing compression molding and a second thickness post compression molding. As illustrated in FIG. 5, prior to experiencing the compression molding process, the intermediate layer 320 fabric may have an approximate thickness of D2. Furthermore, as further explained previously, the interior layer 310 may be constructed from a single layer polyester mesh material having an approximate thickness of D3. The single layer polyester mesh material of the interior layer 310 may contain 10-15% spandex, elastane, or other material that contains a high elongation modulus. In the embodiment illustrated, the thickness D1 of the exterior layer 300 may be approximately 0.2 mm, the pre-compression thickness D2 of the intermediate layer 320 may be approximately 2.5 mm, and the thickness D3 of the interior layer 310 may be approximately 1.0 mm. Thus, the fabric laminate 500 of the upper 130 may contain a total pre-compression thickness of approximately 3.7 mm. As previously explained, the intermediate layer 320 may compress from approximately 2.5 mm to approximately 1.0 mm, resulting in the fabric laminate 500 of the upper 130 having a total post-compression thickness of approximately 2.2 mm. In still other embodiments, fabric layers of the fabric laminate 500 may be formed of any type of material including, but not limited to, woven or nonwoven textiles, knit textiles, leather, synthetic leather, natural rubber, synthetic rubber, elastomers (e.g., thermoplastic polyurethane), siloxanes, GORETEX, etc.

The compression mold equipment or apparatus used to secure the plurality of layers together to form the fabric laminate 500 includes a pair of molding portions 510, 520. In particular, the mold portions include a first molding portion 510 that includes a first surface with a plurality of ridges and depressions and a second molding portion 520 that also includes a second surface with a plurality of ridges and depressions. The first surface is complementary to the second surface such that the first molding portion 510 and the second molding portion 520 are configured to be received by and engage with one another. That is, the first surface of the first molding portion 510 and the second surface of the second molding portion 520 are configured to be pressed together and intermeshed with one another. The second surface of the second molding portion 520 may be a mirror or reverse image of the first surface of the first molding portion 510. The plurality of ridges and depressions disposed on the first and second surfaces of the first and second molding portions 510, 520, respectively, are shaped similar to that of the pattern 150 of the upper 130 of the article of footwear 10. Thus, the compression mold apparatus is configured to shape the layers 300, 310, 320 into the pattern 150 of the upper 130 as the layers 300, 310, 320 are pressed together between the first and second molding portions 510, 520 during the compression molding process. The molding of the layers 300, 310, 320 can be performed in a single compression mold operation (e.g., combining all layers 300, 310, 320 in their proper orientation or "stacked" positions and then pressing together within the mold apparatus) or in a plurality of compression mold operations (e.g., press two layers together in the mold, following by pressing further layers together, etc. until the final fabric laminate 500 is formed). The final fabric laminate 500 formed by the compression mold apparatus will have a contour or shape that is suitable for the location in which the fabric laminate is to be utilized for forming the upper 130. For example, the heel cup 134, lateral quarter 136, medial quarter, and ankle extension 140 can be formed with the auxetic pattern 150, while the toebox 132 can be formed smooth without the auxetic pattern 150, as depicted in FIGS. 1 and 2.

Prior to placing the layers 300, 310, 320 into the compression molding apparatus formed by the first molding portion 510 and the second molding portion 520, the materials used to form the layers 300, 310, 320 may be initially prepared as necessary (e.g., by cutting each material from a blank to the appropriate size/dimensions for the mold apparatus). Each material portion forming the layers 300, 310, 320 can be initially configured as a generally flat sheet of material. The mold portions 510, 520 can further be heated to suitable temperatures for the mold process. The compression molding process forms a shaped and contoured portion of the upper 130 that is patterned in the form of the mold portions 510, 520, and which holds and maintains its shape. In particular, the upper 130 can each be formed via the compression molding process, with the same or different number and/or types of material layers.

The article of footwear 10 described herein is capable of providing an improved and comfortable fit because of the compression molding (e.g., thermoforming) process and the three dimensional auxetic pattern 150 formed in the upper 130. The compression molding process of the upper 130 enables the upper 130 to be constructed with a minimal amount of seams or cuts in the material. This reduces or eliminates the potential for the upper 130 to cause any type of irritation, sores, or pressure points on the foot disposed within the article of footwear 10. The compression molding process, as described above, further enables the upper 130 to be constructed with a three dimensional auxetic pattern 150 disposed in the upper 130. The three dimensional auxetic pattern 150 may be disposed over the entire surface of the upper 130, or disposed in limited portions of the upper 130 (i.e., the heel, the toebox, the instep, the tongue, etc.).

As previously explained, the pattern 150 is disposed on the upper 130 through a series of ridges and protrusions that create a three dimensional auxetic arrangement within at least a portion of the upper 130. With the upper 130 being constructed with a three dimensional auxetic pattern 150, the upper 130 of the article of footwear 10 is capable of providing an improved fit that is both more comfortable and more supportive than that of conventional uppers of conventional articles of footwear. Because different feet and ankles contain different dimensions and curvatures, conventional uppers are unable to provide a comfortable fit to a wide variety of foot sizes and shapes. However, the three dimensional auxetic pattern 150 of the upper 130 of the article of footwear 10, as described above, enables the upper 130 to have elastic and expandable properties that allowing the upper 130 of the article of footwear 10 to provide a comfortable and supportive fit for various foot sizes and shapes. The three dimensional auxetic pattern 150 further enables the upper 130 to fit more closely around any type of foot disposed within the upper 130, regardless of the shape of the foot, without creating pressure points or causing irritation.

In addition, while providing a comfortable fit for a wide variety of feet, the three dimensional auxetic pattern 150 of the upper 130 of the article of footwear 10 is also able to simultaneously provide a supportive fit for a wide variety of feet. During athletic activity or events (i.e., walking, running, jumping, etc.), where the foot of the wearer of the article of footwear 10 bends and flexes during the activity, the three dimensional auxetic pattern 150 enables the upper 130 to continue to adhere closely around the foot and the ankle of the foot of the wearer. That is, the upper 130 equipped with the three dimensional auxetic pattern 150 is capable of bending and flexing with the foot of the wearer without, or with limited, folding or creasing by the three dimensional auxetic pattern 150 of the upper 130. This enables the upper 130 to sit closely against the surface of the foot disposed within the upper 130 and remain in contact with the surfaces of the foot as the foot bends and flexes during the athletic activities.

With the high top configuration of the article of footwear 10 illustrated in FIG. 1, the ankle portion 140 of the upper 130, which includes the three dimensional auxetic pattern 150, is configured to cover and contour to the shape of a wide variety of ankles of wearers of the article of footwear 10. The three dimensional auxetic pattern 150 enables the ankle portion 140 of the upper 130 to conform to the curvatures of the wearer's ankle, where the three dimensional auxetic pattern 150 of the ankle portion 140 acts as an ankle wrap that still enables a large range of motion for the ankle.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. For example, the upper may be formed of any materials suitable for its described purpose. In particular, the upper may include thermoformable material capable of holding contours as well as structures or texture therein. The material may be a textile laminate (fabric laminate) including one or more fabric (textile) layers, one or more foam layers, and/or one or more structural support layers disposed internally within the upper (i.e., located between two or more layers within the plurality of layers forming the upper), where the fabric laminate is capable of being shaped via compression molding.

The one or more fabric layers provided in the fabric laminate can comprise any suitable textile, herein defined as fabrics and other manufactured products made from strands such as fibers, filaments, and yarns. By way of example, the textiles include knit, woven, nonwoven, embroidered, and braided constructions. The strands forming the fabric may include hard yarns or resilient yarns possessing stretch and recovery characteristics. Specifically, the hard yarns may include any one or combination of compounds selected from the group consisting of polyurethanes, polyesters (e.g., polyethylene terephthalate), polyolefins (e.g., polyethylene and polypropylene), polyamides (e.g., aliphatic or aromatic polyamide materials, such as nylon), and any suitable combinations or copolymers thereof. Regarding elastic yarns, the strands include elastomeric materials such as a polyester-polyurethane copolymer commercially available under the names elastane, LYCRA and SPANDEX.

A fabric layer can further be formed of synthetic or natural leather or may even further comprise a plurality of layers (e.g., a plurality of layers comprising waterproof and breathable properties, such as fabric layers commercially available under the name GORETEX). The fabric layers can include elastomers that provide any suitable degree of stretch (e.g., two way stretch or four way stretch) at any one or more locations of the upper.

The fabric layers may possess any thickness suitable for its described purpose. In example embodiments, the fabric layers can have thicknesses in the range of about 0.25 mm to about 4 mm, e.g., about 0.50 mm to about 3 mm.

The one or more foam layers provided in the fabric laminate can comprise any suitable one or more type(s) of open and/or closed cell foam materials that provide adequate cushioning and comfort for the intended purpose. In particular, an open-celled, thermoplastic foam may be utilized. Some examples of types of foam materials suitable for use in forming the upper include, without limitation, polyolefins (e.g., polyethylene or polypropylene) foam materials, ethylene vinyl acetate (EVA) foam materials and polyurethane (PU) foam materials. The foam materials can have a thickness that is greater than the fabric materials. In example embodiments, the foam materials can have thicknesses in the range of about 1 mm to about 10 mm, e.g., about 2 mm to about 8 mm (e.g., about 3 mm to about 6 mm). Foam layers can vary in thickness depending upon where such foam layers are located along the upper. In an example embodiment, a foam layer that is about 6.0 mm thick is provided between fabric layers in the planum portion 205 that serves as a cushioning foot bed for the wearer's foot.

The one or more internal structural support members provided within the fabric laminate that forms the upper can be formed of any suitable type(s) materials that deform during the compression molding process and provide structural support for the upper at the location(s) in which the support members are provided once the material cools. In particular, the materials used to form the internal structural support members can be formed so as to have a hardness value (e.g., as measured on a Shore A hardness scale, a Shore A hardness) that is greater than the hardness value (e.g., Shore A hardness) of the materials used to form the foam and fabric layers of the fabric laminate. Some examples of materials that can be used to form the internal structural support members include, without limitation, polyurethanes, polyolefins, polyamides (e.g., nylon), ethylene vinyl acetate (EVA), etc. In example embodiments, one or more internal structural support members are formed from a thermoplastic polyurethane (TPU) material, such as a TPU material commercially available from Chemex Company Ltd. During the formation of the fabric laminate, the internal structural support member can be formed from a flat sheet that is contoured during the compression molding process. Alternatively, the internal structural support member can be formed from starting materials comprising a powder composition that is fused and hardened into a single, unitary member either prior to or during the compression molding process. The internal structural support member can have a thickness in the range of about 0.2 mm to about 2.0 mm (e.g., a thickness of about 1.0 mm).

As noted herein, the fabric laminate that forms the upper comprises a plurality of layers and can include any selected number of layers, where different fabric laminates including different types and/or numbers of layers can be provided at different locations of the upper. For example, some locations of the upper may include one or more internal structural support members while other locations do not, thus changing the structural configuration of the fabric laminate at different locations of the upper. Example fabric laminate layers used to form portions of the upper for the shoe depicted in the figures include a series of layers as follows (from internal or foot facing side to external side of the upper): fabric layer/foam layer/reinforcing fabric layer/foam layer/fabric layer. For fabric laminate layers that include an internal structural support layer, the internal structural support member can be provided as a layer disposed at any location within the fabric laminate such that at least one layer is located on one side of the internal structural support layer and at least one layer is located on the other side of the internal structural support layer.

In addition, various features from one of the embodiments may be incorporated into another of the embodiments. Accordingly, it is appropriate that the appended claims be construed broadly and in a manner consistent with the scope of the disclosure as set forth in the following claims.

What is claimed is:
1. An article of footwear comprising:
a sole structure; and
an upper coupled to the sole structure, the upper being configured to receive at least a portion of a human foot, the upper comprising:
a toebox, a medial quarter, a lateral quarter, a heel cup, and
a three dimensional structure having auxetic properties formed at least partially along the medial quarter, lateral quarter, and heel cup of the upper, the three dimensional structure is constructed of a plurality of panels that are pivotally coupled one another such that the plurality of panels are repositionable between an unexpanded position, where the plurality of panels are in an out of plane position, and an expanded position, where the plurality of panels are in an in-plane position, wherein the three dimensional structure having auxetic properties defines a primary expansion direction, a secondary expansion direction, and a tertiary expansion direction, the secondary expansion direction is transverse to the primary expansion direction, and the tertiary expansion direction is normal to a plane defined by the primary expansion direction and the secondary expansion direction, and wherein, when the three dimensional structure having auxetic properties is imparted with an expansion force in the primary expansion direction or the secondary expansion direction, the plurality of panels are repositioned from the unexpanded position to the expanded position, causing the three dimensional structure having auxetic properties to expand in the tertiary expansion direction.

2. The article of footwear of claim 1, wherein the upper further comprises:
an exterior layer;
an interior layer; and
an intermediate layer disposed between the exterior layer and the interior layer.

3. The article of footwear of claim 2, wherein the upper is formed from a compression molding process where the exterior layer, intermediate layer, and interior layer are compressed within a compression mold apparatus and shaped into the three dimensional structure having auxetic properties.

4. The article of footwear of claim 1, wherein the plurality of panels include a series of first segment types and second segment types, the first segment types having a first size and the second segment types having a second size, the first size being double the second size.

5. The article of footwear of claim 4, wherein the first segment types and the second segment types are interconnected with one another to form a series of protrusions and depressions that are interconnected via a series of living hinges.

6. The article of footwear of claim 4, wherein the first segment types and second segment types are triangular.

7. An article of footwear comprising:
a sole structure; and an upper coupled to the sole structure, the upper being configured to receive at least a portion of a human foot, wherein a three dimensional structure having auxetic properties is formed on at least a portion of the upper, the three dimensional structure having a plurality of panels that are pivotally coupled one another such that each panel are repositionable between an unexpanded position, where the plurality of panels are in an out of plane position, and an expanded position, where the plurality of panels are in an in-plane position, wherein the three dimensional structure having auxetic properties defines a primary expansion direction, a secondary expansion direction, and a tertiary expansion direction, the secondary expansion direction is transverse to the primary expansion direction, and the tertiary expansion direction is normal to a plane defined by the primary expansion direction and the secondary expansion direction, and wherein the plurality of panels are repositioned from the unexpanded position to the expanded position, causing the three dimensional structure having auxetic properties to expand in the tertiary expansion direction, when the three dimensional structure having auxetic properties is imparted with an expansion force in the primary expansion direction or the secondary expansion direction.

8. The article of footwear of claim 7, wherein the three dimensional structure having auxetic properties defines a primary compaction direction and a secondary compaction direction, the secondary compaction direction being transverse to the primary compaction direction.

9. The article of footwear of claim 8, wherein the three dimensional structure having auxetic properties further defines a tertiary compaction direction that is normal to a plane defined by the primary compaction direction and the secondary compaction direction.

10. The article of footwear of claim 9, wherein the three dimensional structure having auxetic properties compresses in the tertiary compaction direction when the three dimensional structure having auxetic properties experiences a compaction force in the primary compaction direction or the secondary compaction direction.

11. An article of footwear including an upper coupled to a sole, the upper comprising a laminate including a textile layer and a foam layer, the upper further comprising a plurality of panels molded into the laminate that form a three dimensional structure having auxetic properties, each of the plurality of panels being pivotally coupled to adjacent panels such that each panel moves from an out of plane position toward an in-plane position, and vice versa, wherein the three dimensional structure having auxetic properties defines a primary expansion direction, a secondary expansion direction, and a tertiary expansion direction, the secondary expansion direction is transverse to the primary expansion direction, and the tertiary expansion direction is normal to a plane defined by the primary expansion direction and the secondary expansion direction, and wherein, when an expansion force is imparted onto the three dimensional structure having auxetic properties in any one of the primary expansion direction, the secondary expansion direction, or the tertiary expansion, each panel of the plurality of panels moves from the out of plane position toward the in-plane position, and the three dimensional structure simultaneously expands in each of the primary expansion direction, the secondary expansion direction, and the tertiary expansion direction.

12. The article of footwear of claim 11, wherein each molded panel is a polygon.

13. The article of footwear of claim 12, wherein the polygon is a triangle.

14. The article of footwear of claim 11, where the panels are organized into a plurality of cells, each cell defining a reentrant shape.

15. The article of footwear of claim 14, wherein the laminate including the cells possesses a lower Poisson's ratio than the laminate not including the cells.

* * * * *